(12) United States Patent
Coleman (10) Patent No.: US 12,415,739 B2
(45) Date of Patent: Sep. 16, 2025

(54) PROCESS FOR A BATCH GRAVITY THICKENING AND FERMENTATION OF A MIXED LIQUOR

(71) Applicant: DENTRO-P, LLC, Yakima, WA (US)

(72) Inventor: Thomas E. Coleman, Yakima, WA (US)

(73) Assignee: DENTRO-P, LLC, Yakima, WA (US)

( * ) Notice: Subject to any disclaimer, the term of this patent is extended or adjusted under 35 U.S.C. 154(b) by 262 days.

(21) Appl. No.: 18/109,840

(22) Filed: Feb. 14, 2023

(65) Prior Publication Data

US 2023/0257290 A1    Aug. 17, 2023

(51) Int. Cl.
  *C02F 3/12* (2023.01)
  *C02F 3/00* (2023.01)
  *C02F 3/30* (2023.01)

(52) U.S. Cl.
  CPC ............ *C02F 3/1263* (2013.01); *C02F 3/006* (2013.01); *C02F 3/305* (2013.01); *C02F 2209/04* (2013.01); *C02F 2303/06* (2013.01)

(58) Field of Classification Search
  CPC .... C02F 2209/04; C02F 3/006; C02F 3/1221; C02F 3/1263; C02F 3/305; C02F 2303/06
  USPC .................................................. 210/620, 607
  See application file for complete search history.

(56) References Cited

U.S. PATENT DOCUMENTS

| | | | |
|---|---|---|---|
| 2,875,151 A | 2/1959 | Davidson | |
| 4,056,465 A | 11/1977 | Spector | |
| 4,162,153 A | 7/1979 | Spector | |
| 4,285,818 A | 8/1981 | Muskat | |
| 4,460,471 A | 7/1984 | Reid | |
| 4,645,592 A | 2/1987 | Calltharp et al. | |
| 4,663,044 A | 5/1987 | Goronszy | |
| 4,775,467 A | 10/1988 | Calltharp et al. | |
| 4,975,197 A | 12/1990 | Wittmann et al. | |

(Continued)

FOREIGN PATENT DOCUMENTS

| | | |
|---|---|---|
| CA | 2481853 A | 4/2006 |
| CA | 2583752 A | 4/2006 |

(Continued)

OTHER PUBLICATIONS

Maier, DE 102018112899 B3, English machine translation, pp. 1-7 (Year: 2019).*

(Continued)

*Primary Examiner* — Claire A Norris
(74) *Attorney, Agent, or Firm* — Svendsen Legal, LLC (57) ABSTRACT

An efficient and low-cost process for gravity thickening and fermentation of waste activated sludge withdrawn from the surface of an activated sludge aeration basin for use with treatment systems designed for "enhanced biological phosphorus removal" (EBPR). One or more reactor tanks are used for the process with the steps of: A fill cycle, in which the waste mixed liquor flows into the tank, followed by a settle cycle, in which the mixed liquor is allowed to settle for a period of time, followed by a decant cycle, in which the clear liquid is withdrawn. The withdrawal of a volume of the settling mixed liquor for discharge is then followed by a ferment period for the remaining settled mixed liquor solids and a transfer of the fermented mixed liquor solids back to the activated sludge liquid stream process.

14 Claims, 5 Drawing Sheets

(56) References Cited

U.S. PATENT DOCUMENTS

| | | | |
|---|---|---|---|
| 5,252,214 | A | 10/1993 | Lorenz et al. |
| 5,582,734 | A | 12/1996 | Coleman et al. |
| 6,040,906 | A | 3/2000 | Harhay |
| 6,051,436 | A | 4/2000 | Reagen et al. |
| 6,882,419 | B2 | 4/2005 | Coleman et al. |
| 7,273,553 | B2 | 9/2007 | Van Loosdrecht et al. |
| 8,568,592 | B2 | 10/2013 | Coleman |
| 10,934,195 | B1 | 3/2021 | Flippin et al. |
| 11,643,348 | B2 | 5/2023 | Coleman |
| 11,807,562 | B2 | 11/2023 | Coleman |
| 2003/0142301 | A1 | 7/2003 | Coleman et al. |
| 2006/0286675 | A1 | 12/2006 | Coleman et al. |
| 2007/0193949 | A1 | 8/2007 | You et al. |
| 2008/0057588 | A1 | 3/2008 | Coleman et al. |
| 2012/0187042 | A1 | 7/2012 | Coleman |
| 2021/0403353 | A1* | 12/2021 | Coleman ............... C02F 3/006 |
| 2022/0259084 | A1 | 8/2022 | Coleman |
| 2023/0257289 | A1 | 8/2023 | Coleman |
| 2023/0257290 | A1 | 8/2023 | Coleman |
| 2024/0327263 | A1 | 10/2024 | Coleman |

FOREIGN PATENT DOCUMENTS

| | | | |
|---|---|---|---|
| CN | 201343460 Y | 11/2009 | |
| DE | 102018112988 B3 * | 3/2019 | ............. C02F 11/02 |
| KR | 100414417 B1 | 11/2001 | |
| KR | 100327154 B1 | 3/2002 | |
| WO | 8100708 A1 | 3/1981 | |

OTHER PUBLICATIONS

Yuan et al, "Sludge Population Optimisation: a new dimension for the control of biological wastewater", Water Research 36(2002) 482-490.

Potter et al, "Optimization of Periodic Biological Process for Nitrogen Removal from Wastewater", Water Research 30 (1996) 142-152.

Daims et al, "Waste Water Treatment: a model system tor microbial ecology", Trends in Biotechnology, vol. 24, No. 11, 483-489, 2006.

Martin et al, "Metagenomic analysis of two enhanced biological phosphorus removal sludge communities", Nature Biotechnology, 24 (10), 1263-1269 2006.

Kuba et al, "Phosphorus and Nitrogen removal with minimal COD requirement by integration of denitrifying dephosphatation and nitrification", Wat. Res. 30 (7) 1702-1710 1996.

Murnleitner et al, "Integrated Metabolic Model for the aerobic and denitrifying biological phosphorus removal", Biotech and Bioengineering, 54 (5), 434-450, 1997.

McMahon et al, "Polyphosphate kinase genes from full-scale activated sludge plants", Appl. Microbiol. Biotechnol. 77:167-173 (2007).

He et al, "Candidatus Accumulibacter population structure in enhanced biological phosphorus removal sludges", Applied and Environmental Microbiology, Sep. 2007, 5865-5874.

Wagner et al, "Microbial community composition and function in wastewater treatment plants", Antonie van Leeuwenhoek, 81:665-680, 2002.

* cited by examiner

PROCESS FOR A BATCH GRAVITY THICKENING AND FERMENTATION OF A MIXED LIQUOR

TECHNICAL FIELD

The present disclosure relates to and is applicable to the treatment of municipal wastewater by the activated sludge process. It is particularly applicable to activated sludge treatment systems which utilize "enhanced biological phosphorus removal" (EBPR), which are typically able to achieve excellent settling activated sludge by providing selective pressure in favor of "phosphorus accumulating organisms" (PAOs) and against the growth of filamentous bacteria, improve total nitrogen removal, improve energy efficiency, and recover of alkalinity.

BACKGROUND OF THE INVENTION

Human activities can accelerate the rate at which nutrients enter ecosystems. Phosphorus (P) is often the limiting nutrient in cases of eutrophication in lakes and rivers subjected to runoff or point source pollution from wastewater treatment plants. At the same time, phosphate rock from which P fertilizers are produced is a non-renewable resource which is being rapidly depleted. More effective process control systems will help to promote the maximum use of "enhanced biological phosphorus removal" (EBPR), where chemical precipitation for P removal might otherwise be used. This is also important because P can be recovered as a by-product of EBPR systems for beneficial use as fertilizer while P from chemical precipitates removed using metal salts cannot be effectively recovered.

It is becoming increasingly common for regulatory agencies to impose limits on phosphorus as well as nitrogen on discharges from wastewater treatment plants. The biological removal of both nutrients is more complex since the efficiency of both processes is dependent, in part, on the available organic carbon (C) substrate in the influent wastewater or from an external source, when necessary.

There is a need for maximizing EBPR in wastewater treatment plant operations, while at the same time achieving the maximum biological nitrogen removal which can be obtained with the available carbon in the influent wastewater. Such a system could be readily implemented in both new and existing treatment facilities and will be applicable to both large and small wastewater treatment plants.

The present invention provides a process to address these needs, and also serves to further increases the selective pressures on the microbial communities which make up the activated sludge in an EBPR system. The changes are expected to result in microbial communities that are more effective at using the influent wastewater carbon to optimized phosphorus and nitrogen removal.

Figure 1:
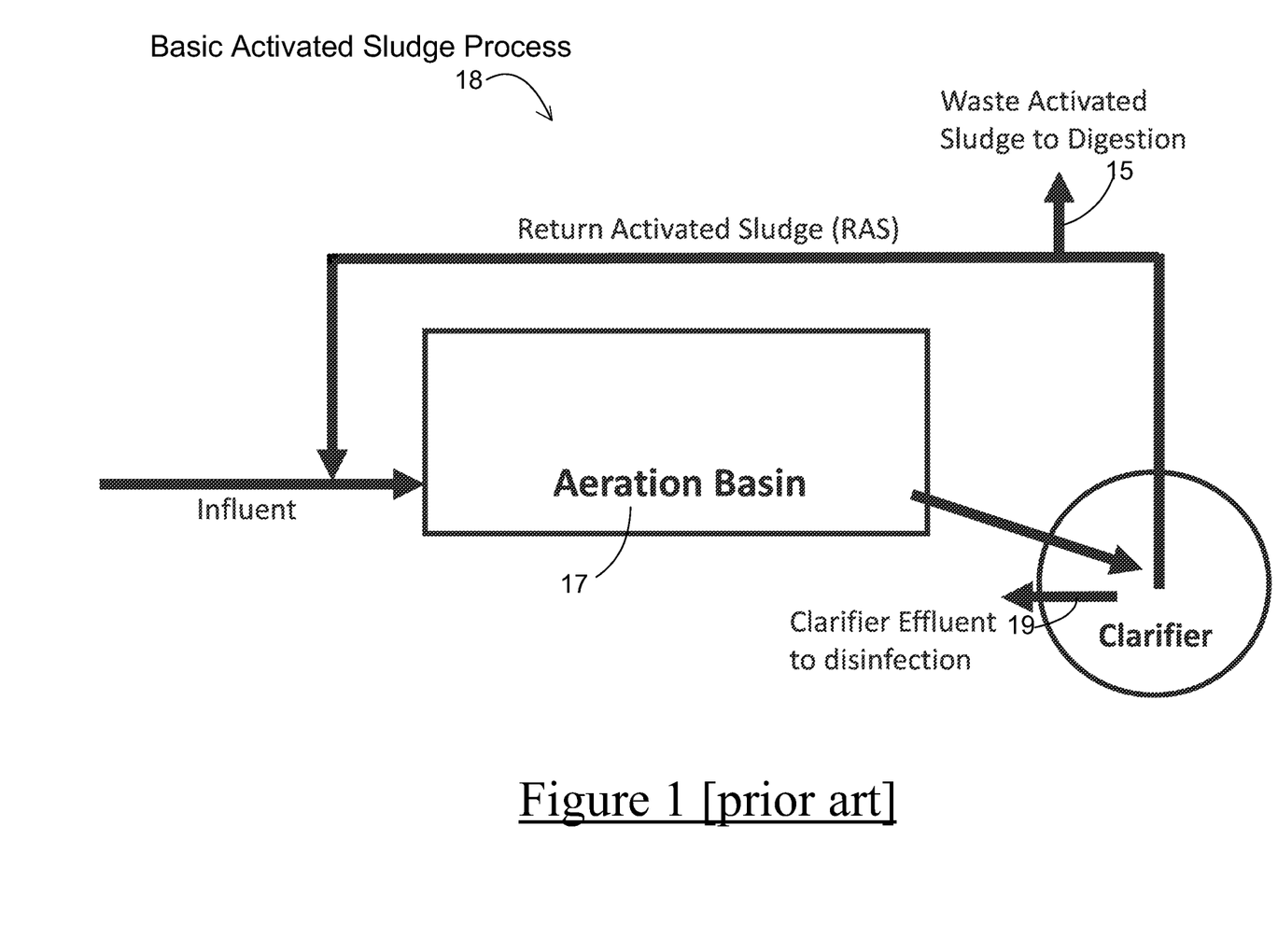
FIG. 1 is a prior art schematic diagram of a basic activated sludge process.

Activated sludge treatment processes have been used for many years for the removal of "biochemical oxygen demand" (BOD) from municipal wastewaters, in an effort to slow or halt the eutrophication of receiving waters. Typically, the process consists of an aeration basin containing a suspension of microorganisms referred to as mixed liquor. Wastewater is fed to the aeration basin and oxygen is utilized by the biomass to sorb, assimilate and metabolize the BOD available in the wastewater. From the aeration basin mixed liquor flows to a clarifier where the biomass settles and treated wastewater overflows. Most of the settled biomass is returned to the aeration basin. A smaller portion is wasted in order to maintain a relatively constant level of biomass in the system. FIG. 1, included herewith, shows a schematic diagram of a Basic Activated Sludge Process Flow configuration.

In a conventional wastewater treatment plant employing a "Biological Nitrogen Removal" (BNR) system, nitrogen (N) removal typically is achieved through both nitrification and denitrification. Nitrification is the oxidation of ammonium to nitrate, catalyzed by bacteria, and is a key part of global nitrogen cycling. Denitrification is the biological reduction of nitrite and nitrate to nitrogen gas by heterotrophic bacteria consuming organic carbon in the absence of oxygen, defined as an 'anoxic' condition. In the first step of nitrification, chemolithoautotrophic Ammonia-Oxidizing Bacteria (AOB) oxidizes ammonium to nitrite. Nitrite is subsequently oxidized to nitrate by a Nitrite-Oxidizing Bacteria (NOB).

Figure 2:
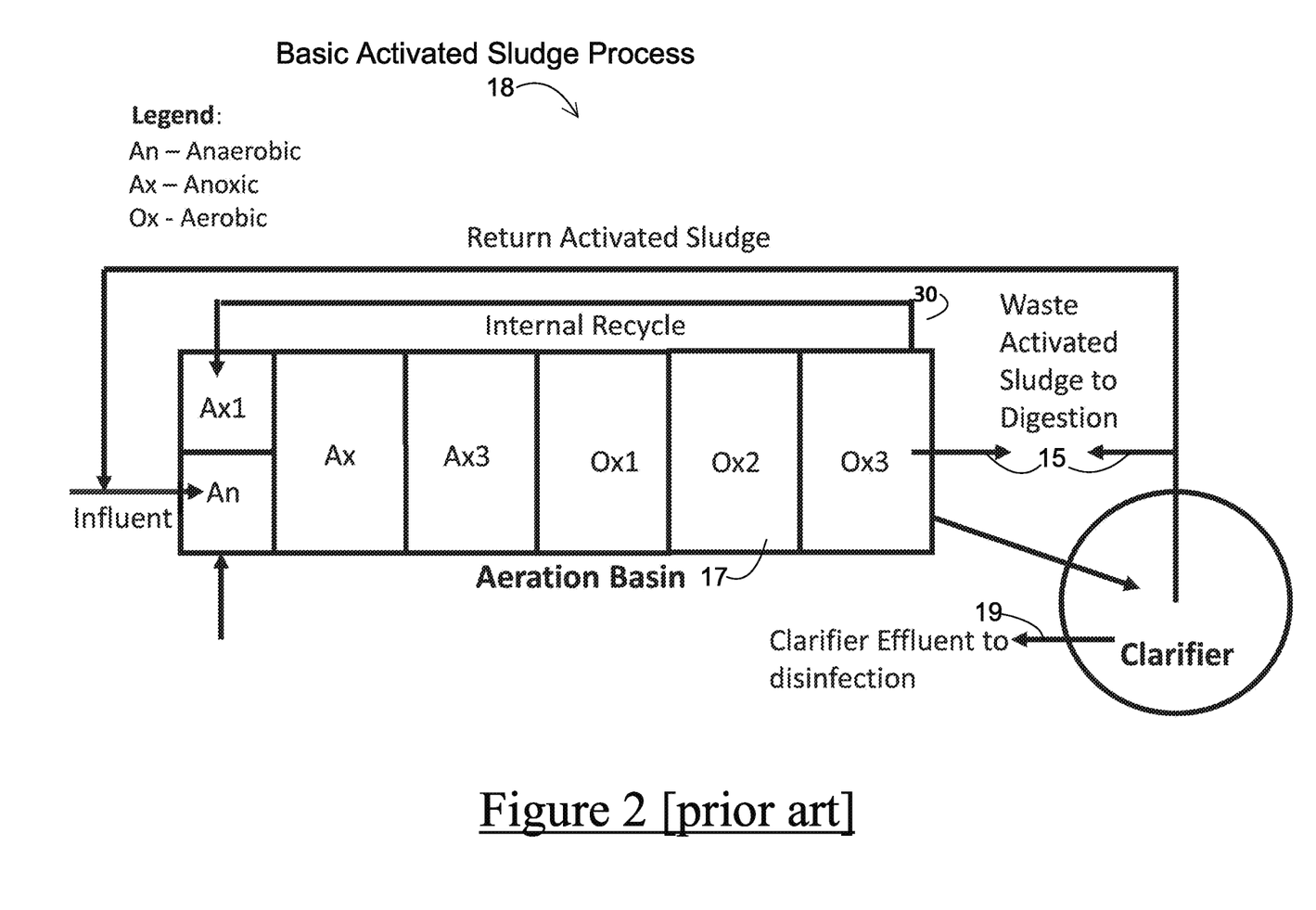
FIG. 2 is a prior art schematic diagram of the "Modified Bardenpho Process" for enhanced biological phosphorus removal and nitrogen removal using the activated sludge process.

The basic engineering principles for the design of P and N removal treatment facilities have been well established and have been implemented in various configurations including, the "Modified Bardenpho" process, the "UCT" process, the "A2O" process, and other conventional techniques. The Modified Bardenpho configuration as used in a conventional activated sludge process for treating waste is shown in FIG. 2. All of these processes include one or more anaerobic zones, followed by one or more anoxic zones and one or more aerobic zones. The Modified Bardenpho and other similar processes utilize internal recycle streams such that minimal nitrate or "dissolved Oxygen (DO) is returned to the anaerobic zone. These pumped recycle stream flow rates must be carefully regulated to assure that the desired process objectives are achieved. Organic carbon in the wastewater to be treated is critical for driving biological denitrification and EBPR. Sufficient organic carbon in the form of "readily biodegradable Chemical Oxygen Demand" (rbCOD) is necessary for denitrifying bacteria to carry out denitrification.

To achieve a desired and effective level of EBPR, it is necessary to provide the phosphorus accumulating organisms (PAO) with adequate supply of "readily biodegradable Chemical Oxygen Demand" (rbCOD) in form of "volatile fatty acids" (VFAs) and appropriate anaerobic conditions free of nitrates. Thus, there is a competition for the available rbCOD between PAO's and denitrifying bacteria. When influent wastewater has a lower concentration of organic carbon the nutrient removal efficiency decreases, or an external source of carbon needs to be added. In order to solve the problem of competition for the limited organic substrate, "denitrifying Phosphorus Accumulating Organisms" (dnPAO) are important.

The mechanism of anaerobic phosphate release of dnPAO is the same as that of "aerobic Phosphorus Accumulating Organisms" (aPAO). External organic substrate is taken up and converted to polyhydroxyalkanoate (PHA) as a cell energy storage product. Phosphorus is taken up under aerobic conditions by aPAOs, as shown in the figure, but uptake can also occur under anoxic conditions by dnPAOs. The denitrifying ability of dnPAOs is a key factor in EBPR process designs for simultaneous denitrification and P removal that can lead to savings in plant operational costs. dnPAO can combine phosphorus removal and denitrification into one process using the same amount of organic carbon substrate. In addition, less aeration is needed which translates into lower energy requirements. Thus, the advantage of selecting for dnPAOs over aPAOs by means of reactor configuration and/or control strategies is very significant. Therefore, selection and enrichment of dnPAO is a key factor in optimizing EBPR and biological nitrogen removal and this is one of the objectives of the current invention.

Until recently, it was accepted that phosphorus could only be removed in conventional EBPR plants when the wastewater characteristics were favorable with an rbCOD/TP ratio of more than 15 to 1. Candidatus Accumulibacter, which was found to be abundant in conventional plants that relied on an external source of VFA and showed no ability to grow and take up phosphorus under anoxic conditions. However, there are examples of non-conventional EBPR plants which perform very well in which the influent wastewater is discharged directly to the anoxic zone. In some cases, the only source of VFA was from the primary sludge fermenter or the VFA that was formed in the anaerobic zone by fermenting RAS. Some EBPR plants have a history of phosphorus uptake in the anoxic zone indicating that different PAOs that can take up phosphorus under anoxic conditions, such as Tetrasphaera, might be present.

In such cases it has been assumed that the only possible VFA source when fermenting mixed liquor, especially RAS, was from the fermentation of non-PAOs and that PAOs survived better by having a much lower decay rate under anaerobic conditions. There is the possibility that with more prolonged and deeper anaerobic conditions, growth of other PAOs may be favored and their behavior may differ from that of the much researched Accumulibacter species found mostly in conventional EBPR plants. A possible answer may be that the "standard" configuration, where all the primary effluent is passed through the anaerobic zone with little regard to the flow rate or the wastewater characteristics, inadvertently favors the selection of species like Accumulibacter that need an external supply of VFA. Fermentation of RAS or mixed liquor has resulted in deeper anaerobic conditions such as indicated by an ORP as low as −300 mV, which allows for the growth of fermenting PAOs such as Tetrasphaera, which could produce additional VFA that would allow organisms such as Candidatus Accumulibacter to grow alongside them. Tetrasphaera encompasses a broad class of bacteria whose diversity has not been well characterized. Still, there are unique traits that some seem to share. All of them can ferment complex organic molecules such as carbohydrates and amino acids (including glucose, glutamate, aspartate) and produce stored carbon in the process. Some Tetrasphaera species can produce VFA (among other metabolites) during fermentation under reduced anaerobic conditions, which could be utilized as substrate by other PAOs. Further, most types of Tetrasphaera are able to denitrify and to couple nitrite/nitrate reduction with phosphorus uptake. Because of these behaviors, the net impact of Tetrasphaera on EBPR could be significant. What is typically modeled as fermentation of rbCOD to VFA would produce storage products to be used for phosphate uptake during anoxic and aerobic phases. If this is the case, significantly more of the available carbon could be used for phosphate removal, and for PAO carbon storage rather than for growth of "other heterotrophic organisms" (OHO). Apparently, the most important parameter for optimal EBPR is that a diversity of PAOs must pass through a deep anaerobic zone defined by an ORP below a certain value. Tentative measurements suggest that ORP values that are at or below about the −300 mV level are linked to the growth of organisms like Tetrasphaera that thrive under those conditions.

Tetrasphaera can ferment higher carbon forms, take up phosphorus, and produce VFA, which can be used by other PAOs while also taking up phosphorus under anoxic conditions. Thus, the inability of most conventional EBPR plants to reduce the ORP to the low values which are needed does not allow Tetrasphaera to thrive. The ability of Tetrasphaera to ferment higher carbon forms is particularly important for removal of phosphorus and nitrogen from wastewater, which do not contain sufficient rbCOD or are from communities in colder regions which will not contain higher concentrations of VFA by the time is gets to the treatment plants.

To reduce the additional selective pressure produced in the treatment process, excess surface wasting of the activated sludge or "waste activated sludge" (WAS) must be removed from the treatment process continuously or semi-continuously in order to maintain steady state conditions. The most common practice for wasting is to withdraw settled solids from the underflow of the clarifier. The advantage of this approach is that the concentration of the WAS is higher than that of the mixed liquor in the aeration basin and therefore the size of some of the solids handling facilities can been reduced. The affected solids handling facilities would include thickeners, dewatering equipment, and digesters. However, one of the strategies which have been successfully employed to select against the growth of filamentous bacteria and foam causing organisms is to waste some or all of the excess WAS as mixed liquor solids from the surface of the aeration basin instead of from the underflow of the clarifier as is the most common practice.

In aeration basins using diffused air, filamentous bacteria and other foam causing organisms are more readily brought to the surface by the small air bubbles and become more abundant in the top layer of the water contained in the basin. While this surface wasting practice is effective in controlling filamentous bacteria and foaming, the mixed liquor wasted in this manner would need to undergo a thickening step to avoid adverse impacts on the other solids handling systems. With conventional flocculent activated sludge systems, this step would usually require the use of mechanical thickening equipment with polymer addition. For EBPR treatment systems that exhibit excellent settling properties surface wasting can, in addition to controlling foaming conditions in aeration basin, also provide additional selective pressure favoring the development and retention of denser, better settling microbial communities including aerobic granular sludge. It is for augmenting these highly efficient types of EBPR systems that the present invention is most suitable.

SUMMARY OF THE INVENTION

The present invention comprises an efficient and low-cost process for gravity thickening and fermentation of waste activated sludge withdrawn from the surface of an activated sludge aeration basin and especially for use with treatment systems designed for "enhanced biological phosphorus removal" (EBPR) which are able to develop microbial communities in the mixed liquor with excellent settling properties.

Surface wasting of mixed liquor from activated sludge aeration basin has been shown to be an effective method of controlling filamentous bacteria growth which can lead to poor settling and also as a effective method for providing selection pressure to support the development of more densified microbial communities in the mixed liquor population including aerobic granular sludge. The fermentation process included in the present invention will support the selective processes, which leads to the greater abundance of Tetrasphaera in the mixed liquor that in turn promotes more efficient use of available carbon in the removal of nitrogen and phosphorus from the wastewater being treated.

The present invention utilizes one or more reactor tanks, which may be referred to herein simply as "tanks" for the thickening and fermentation of mixed liquor wasted from the surface of an aeration basin with the thickening and fermentation taking place in a sequential process. The processes most preferably occurs in the following primary steps:

A Fill Cycle, in which the waste mixed liquor flows into the tank until the maximum fill set point is reached;

A Settle Cycle, in which the mixed liquor is allowed to settle for a predetermined period of time;

A Decant Cycle, in which the clear liquid is withdrawn using a decanter mechanism;

Withdrawal of a predetermined volume of the settling mixed liquor for discharge to the solids handling systems for treatment and disposal;

A Ferment Period for the remaining settled mixed liquor solids, which continues for a predetermined period of time; and A Transfer of the fermented mixed liquor solids back to the activated sludge liquid stream process.

The preferred process then repeats beginning again with a Fill Cycle. For a continuous flow activate sludge treatment process, two or more batch thickener/fermenter tanks may be needed which would operate alternately or in a scheduled sequence if more than two tanks are used. For continuous flow treatment process, an "aerated equalization tank" could also be used to store mixed liquor drawn from the surface to reduce the number of the batch thickener/fermenter tanks needed. Key objectives of the present invention include:

Thickening the mixed liquor wasted from the surface of an activated sludge process to reduce the size and cost of the subsequent solids handling and solids treatment systems used to produce stabilized biosolids for beneficial use.

Employing an automated microprocessor control system using liquid and solids interface sensors and "Oxidation-Reduction Potential" (ORP) sensors as process variable inputs to automate fill, settle, decant, sludge withdrawal, and ferment cycles. Limiting the amount of phosphorus which is released from the PAOs and returned to the liquid stream processes during the thickening and settling processes.

Providing additional selective conditions promoting the growth of Tetrasphaera as a result of the fermentation conditions which will occur in the settled mixed liquor bed during thickening and fermentation process taking plan under the present invention.

BRIEF DESCRIPTION OF THE DRAWINGS

Exemplary embodiments of the technology will become more fully apparent from the following descriptions and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations. Details that are not necessary for an understanding of the present invention by one skilled in the technology of the invention, or render other details difficult to perceive, may have been omitted.

DETAILED DESCRIPTION OF SPECIFIC EMBODIMENTS

The gravity thickener/fermenter process of the present invention can be incorporated into new and existing activated sludge processes configurations to achieve improved "enhanced biological phosphorus removal" (EBPR), and improved nitrogen removal. The following detailed description of the innovation will be provided here by way of example; however, it should be noted that other similar process configurations could be utilized in applying this process.

Exemplary embodiments of a "Process for a Batch Gravity Thickening and Fermentation of a Mixed Liquor" 100, or more simply referred to herein as the "Batch Thickening and Fermentation Process", or the "process of the present invention" in the alternative, will be best understood by reference to the drawings included herewith, wherein like parts are designated by like numerals throughout. The process of the present invention receives and processes through thickening and fermentation, a "Surface Waste", which also can be referred to herein as the "Waste Mixed Liquor" 15. The Surface Waste preferably originates from a broadly equivalent "Aerated Zone" 17, alternatively referred to as an "Aeration Basin", or an "Aerated Basin" of a conventional EBPR wastewater treatment process, as shown in the Basic Activated Sludge Process 18 of prior art FIG. 1 and prior art FIG. 2. As an intended goal, the Basic Activated Sludge Process produces a Clarifier Effluent 19, typically fed to a disinfection process prior, to release or discharge to the environment.

It can be readily understood that the components and steps of the process of the present invention, as generally described and illustrated in the figures herein, could be arranged and designed in a wide variety of different but equivalent configurations. Thus, the following more detailed description of the embodiments of the process, including apparatus, system, and methods is not intended to limit the scope of the invention, as claimed, but is merely representative of exemplary embodiments of the technology.

Figure 3:
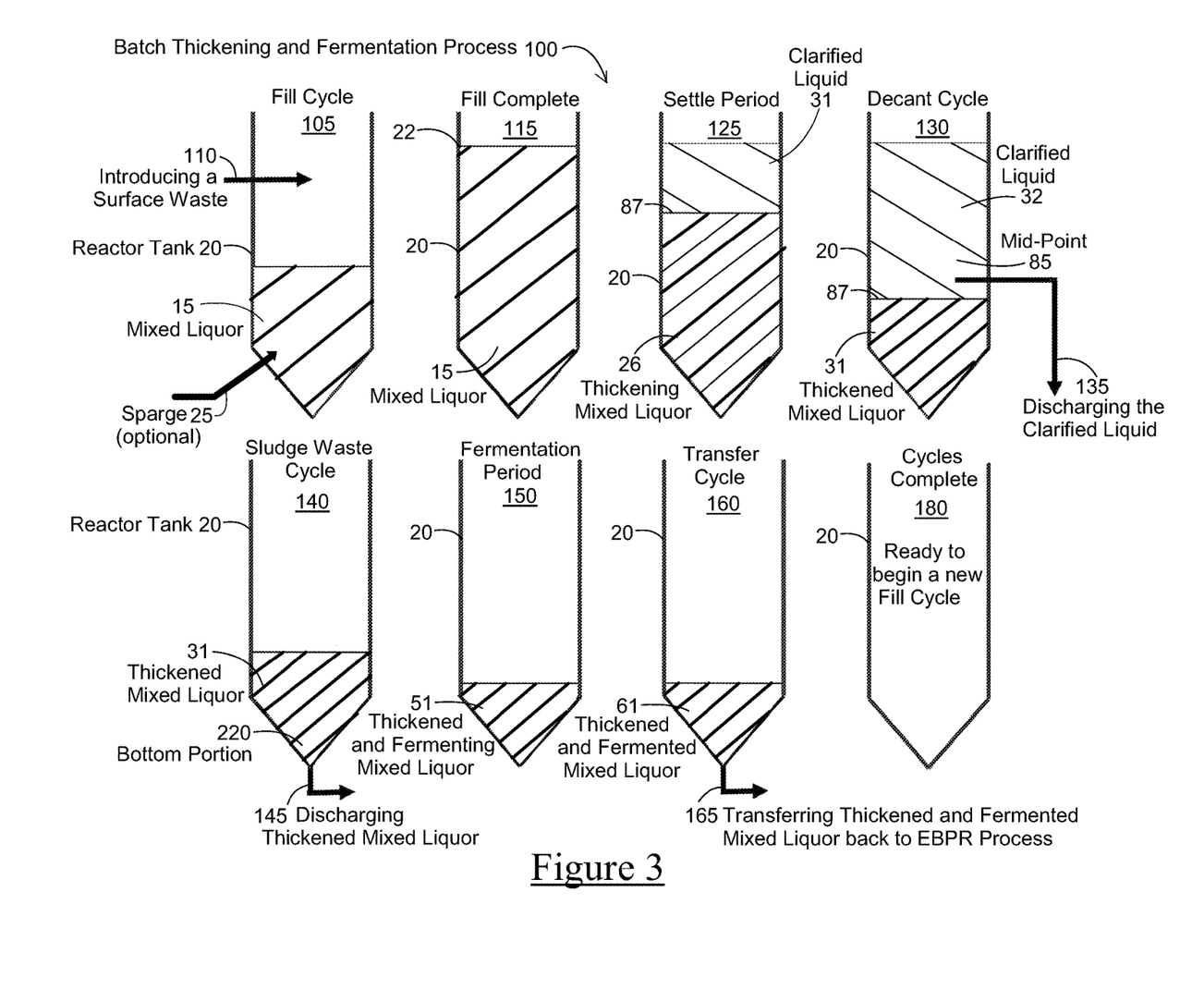
FIG. 3 is a schematic diagram a Batch Thickening and Fermentation Process for handling Surface Waste from the Aerated Zone of an EBPR Wastewater Treatment Process.
Figure 4:
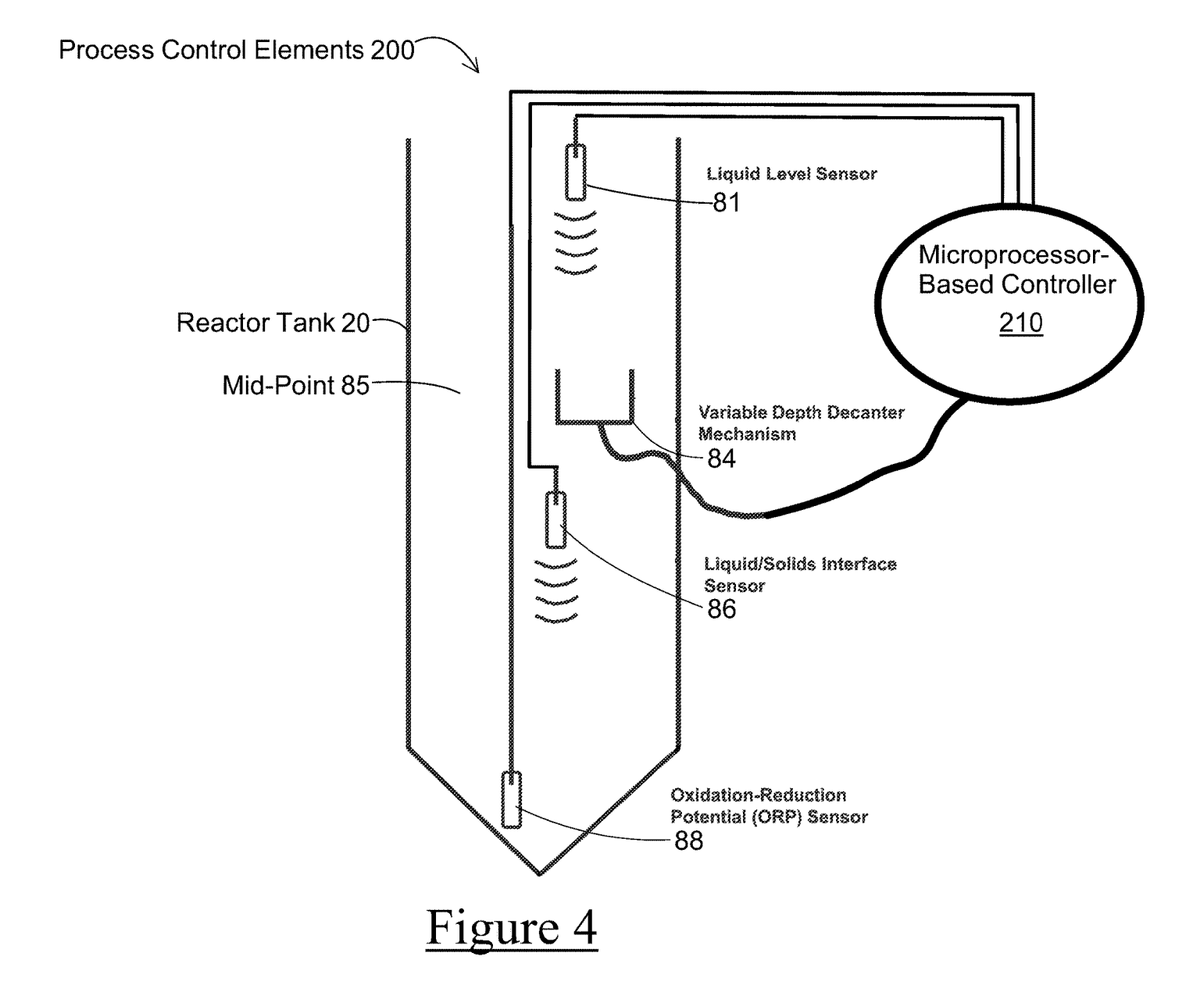
FIG. 4 is a diagram showing the process control elements for a Batch Thickening and Fermentation Process for handling Surface Waste from the Aerated Zone of an EBPR Wastewater Treatment Process, as utilized in an embodiment of the present invention.
Figure 5:
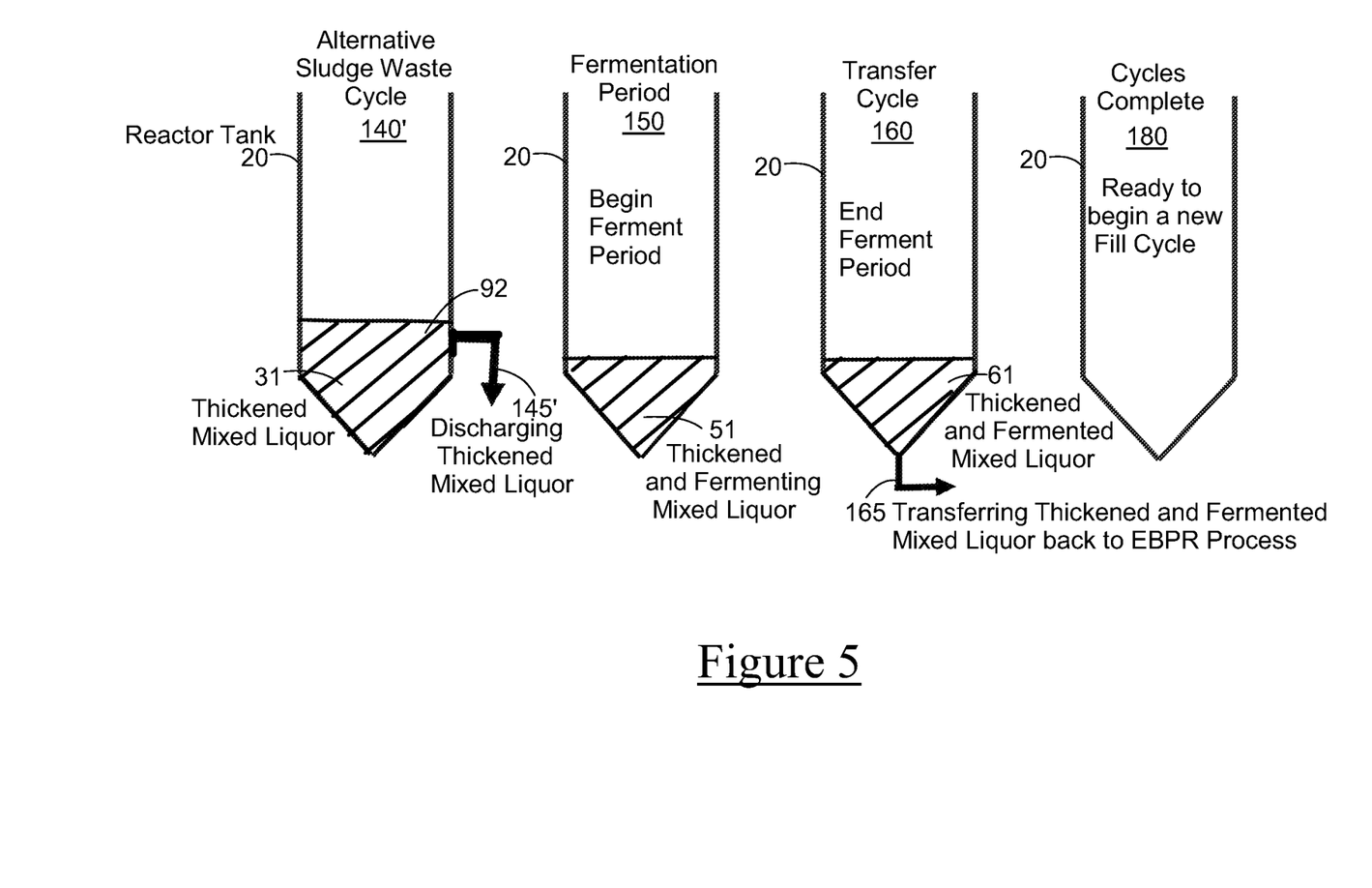
FIG. 5 is a is schematic diagram showing an alternative sludge wasting option that includes withdrawing and wasting sludge from the top of the settled mixed liquor bed within the reactor tank.

Referring to FIGS. 3 through 5, the process of the present invention 100 can be applied to new and existing waste treatment process designs and other activated sludge process configurations to achieve EBPR and improved nitrogen removal, such as found in biological phosphorus removal and biological nitrogen removal treatment processes.

The technical description of the innovations of the present invention will be provided here by way of example. However, it again should be noted that other similar process configurations could be utilized in applying embodiments of the novel process steps and methods disclosed and described herein. FIG. 3 is a schematic of a preferred embodiment of the thickener and fermenter process of the present invention 100, which is executed as a batch reactor tank process comprised of a sequence of the following steps:

A Fill Cycle 105, in which a "waste mixed liquor", simply referred to herein as a Mixed Liquor 15, which is the content of an Introduced Surface Waste 100 that flows into a Reactor Tank 20, until a Maximum Fill Set Point 22 is reached at a Fill Complete 115. The Reactor Tank is a "batch gravity thickener and fermenter reactor tank", which may be more simply referred to herein as the "Reactor Tank".

In the Fill Cycle 105, the Mixed Liquor 15, again which is a waste stream of activated sludge, drawn from the surface of the mixed liquor in a conventional Aeration Basin 17, and is transferred into the Reactor Tank 20. The Fill Cycle continues until a predetermined liquid level is reached in the tank or until a predetermined time interval has elapsed, whichever is first. If necessary to limit the release of phosphorus from the PAOs during the Fill Cycle, a diffused air stream "Sparge" 25 can be introduced proximate to the bottom of the Reactor Tank as an optional aeration of the Mixed Liquor.

A Settle Period 125, in which the Mixed Liquor is allowed to settle for a predetermined period of time as a Thickening Mixed Liquor 26, and further concentrated into a Thickened Mixed Liquor 31.

When the Fill Cycle 105 terminates with the Fill Complete 115 step, the Settle Period 125 begins when the Mixed Liquor that has been wasted from the surface of the Aeration Basin 17 is allowed to settle under quiescent conditions as the Thickening Mixed Liquor 26. If the Sparge 25 aeration is used during the Fill Cycle, it must be halted before the Settle Period begins. As the Mixed Liquor settles during the Settle Period, the interface between its solid phase and clear liquid phase of the Clarified Liquid 31 is monitored with a sensor system and interface level measurement is input into a Microprocessor-Based Controller 210, as discussed later herein, in reference to FIG. 4. When the liquid/solids interface reaches a predetermined set point, or a predetermined period of time has elapsed (whichever occurs first), the Settle Period will be terminated and the Decant Cycle will begin.

A Decant Cycle 130, in which a Clarified Liquid 32 is withdrawn from the Reactor Tank 20, using a conventional decanter mechanism. The Decant Cycle begins when the Settle Period 125 completes. The clear, Clarified Liquid 31 above the settled bed of the Thickened Mixed Liquor 31 is withdrawn in the Discharging of the Clarified Liquid 135, preferably using a Variable Depth Decanter Mechanism 84, which may be a floating and articulating apparatus preferably positioned proximate to a mid-point 85 in the Reactor Tank, as shown and discussed later herein, in reference to FIG. 4.

Preferably, the liquid level in the Tank Reactor is measured using a radar or alternatively an ultrasonic Liquid Level Sensor 81, and this sensed level is compared to the liquid/solids interface level continually during the Decant Cycle 130. When a predetermined differential set point between the liquid level and the liquid/solids interface is reached, the Decant Cycle is terminated by the Microprocessor-Based Controller 210. The Clarified Liquid 31 decanted will be similar in quality to the Clarifier Effluent 19, and can be discharged downstream of the clarifiers.

A Sludge Waste Cycle 140, in which of a predetermined volume of Thickened Mixed Liquor is withdrawn from the Reactor Tank for discharge of a Thickened Mixed Liquor 145, preferably to a solids handling systems for treatment and disposal. The Sludge Waste Cycle begins when the Decant Cycle 130 is complete, and a portion of the settled Thickened Mixed Liquor 31 can be withdrawn as a "waste activated sludge" (WAS). The WAS can be conveyed to conventional solids handling and treatment process units, such as digestion and dewatering prior to beneficial use as biosolids.

The normal operational steps for the Sludge Waste Cycle 140 would be a withdrawal of the settled Thickened Mixed Liquor 31 from a point proximate to the bottom of the Reactor Tank 20, as shown schematically in FIG. 3. The volume of WAS or Thickened Mixed Liquor removed in each Sludge Waste Cycle would be based on a predetermined set point entered into the Microprocessor-Based Controller 210. Alternatively, the WAS could be withdrawn proximate to the top of the settled bed of Thickened Mixed Liquor, as shown in FIG. 5 and discussed later herein.

A Fermentation Period 150 for the remaining settled Thickened Mixed Liquor 31, which continues for a predetermined period of time, to form a Thickened and Fermenting Mixed Liquor 51 within the Reactor Tank 20.

When the WAS portion of the Thickened Mixed Liquor 31 withdrawal is complete, the Fermentation Period 150 begins. The remaining settled Thickened Mixed Liquor is allowed to remain in the Reactor Tank 20 to undergo a period of fermentation. The "oxidation-reduction potential" (ORP) of the settled bed of Thickened and Fermenting Mixed Liquor 51 is continuously measured and recorded. The fermentation period will continue until the ORP has remained at or below a predetermined value for a predetermined period of time. A maximum time would also be set in the Microprocessor-Based Controller 210, which would terminate the Fermentation Period in the event that the other conditions had not yet been met within that maximum time period.

A Transfer Cycle 160, in which of a Thickened and Fermented Mixed Liquor 61 as a final product for the Fermentation Period 150 is Transferred as the Thickened and Fermented Mixed Liquor 165, back to the Basic Activated Sludge Process 18. At the end of the Fermentation Period, all of the settled solids in the Thickened and Fermenting Mixed Liquor 51 have undergone a period of fermentation to become Thickened and Fermented Mixed Liquor, and Transferred as Thickened and Fermented Mixed Liquor to the EBPR process 165. These fermented solids would normally be returned to one of the anoxic zones of the Aeration Basin 17, as shown in FIG. 2, but could be discharged to any of the other zones, if desired.

With the Cycles Complete 180, the Reactor Tank 20 is substantially empty and the preferred process of the present invention 100 then repeats beginning again with the Fill Cycle 105. For a continuous flow activated sludge treatment process, two or more batch thickener and fermenter Reactor Tanks may be needed which would operate alternately or in a scheduled sequence, if more than two Reactor Tanks are used. For continuous flow treatment process, an "aerated equalization tank" could also be used to store mixed liquor drawn from the surface to reduce the number of the batch thickener and fermenter Reactor Tanks needed.

FIG. 4 is a diagram showing Process Control Elements 200 for a preferred embodiment of the Batch Thickening and Fermentation Process 100. The Process Control Elements provide inputs to a Microprocessor-Based Controller 210 as are well known to those skilled in process control technology, specifically programmed to execute the program logic for the sequential steps of the process of the present invention.

Specific Process Control Elements are shown in FIG. 4, as positioned within the Reactor Tank 20, and connected to the Microprocessor-Based Controller. A Liquid Level Sensor 81 is shown proximate to a top portion of the Reactor Tank, and is most useful in determining that the Mixed Liquor Waste 15 has reached the Maximum Fill Set Point 22 of the Fill Complete 115 step of the present invention. A Variable Depth Decanter Mechanism 84 is also included for use in the Decant Cycle 130, for decanting the Clarified Liquid 32 in the Discharging the Clarified Liquid 135 process step.

A Liquids/Solids Interface Sensor 86 is also a conventional sensor, and also is used in the Decant Cycle 130 to determine a Liquid/Solid Interface Level 87, between the Thickened Mixed Liquor 31 and the Clarified Liquid 32 within the Reactor Tank 20. An "Oxidation-Reduction Potential" (ORP) Sensor 88 is also a conventional sensor preferably employed in the Fermentation Period 150 process step, to determine the fermentation achieved in the Thickened and Fermenting Mixed Liquor 51, as it converts to the Thickened and Fermented Mixed Liquor 61. The method of monitoring the Liquid/Solid Interface Level, between the Thickened Mixed Liquor and the Clarified Liquid could include but is not limited to radar or ultrasonic level transmitter sensors, capacitance sensors, or a CCD camera together with image recognition software applications in the Microprocessor-Based Controller 210.

An alternative preferred embodiment of the present invention are shown schematically in FIG. 5, with an Alternative Sludge Waste Cycle 140' option that includes a Discharging Thickened Mixed Liquor 145' from a top portion of the settled bed 92 of the Thickened Mixed Liquor 31 within the Reactor Tank 20. This alternative potentially provides a more desirable Thickened Mixed Liquor from the Reactor Tank, with less solids than produced in the Discharging Thickened Mixed Liquor 145 from a bottom portion 220 of the Reactor Tank, as provided for in the Sludge Waste Cycle 140 depicted in FIG. 3. For this alternative preferred embodiment, the proceeding process steps after the Alternative Sludge Waste Cycle are essentially unchanged as shown in FIG. 5 as compared to FIG. 3, with the Fermentation Period 150 the Transfer Cycle 160 and the Cycle Competing 180 as shown in both Figures.

For the Detailed Description of Specific Embodiments as described and illustrated herein, the terms "connected", "attached", "coupled" and "mounted" refer to any form of interaction between two or more elements, including mechanical, electrical, magnetic, electromagnetic, fluid, and thermal interaction. Two components may be functionally coupled with or to each other, even though they are not in direct contact with each other.

Also, the terms "approximately" or "approximate" are employed herein throughout, including this detailed description and the attached claims, with the understanding that is denotes a level of exactitude commensurate with the skill and precision typical for the particular field of endeavor, as applicable.

Additionally, the terminology used in this Detailed Description of Specific Embodiments is to be interpreted according to ordinary and customary usage in the field of the invention as exemplified in the pertinent U.S. and International Patent Classification Codes, and equivalent codes in other patent classification systems.

The word "embodiment" is used herein to mean "serving as an example, instance, or illustration." Any embodiment described herein is not necessarily to be construed as preferred or advantageous over other embodiments. While the various aspects of the embodiments are presented in drawings, the drawings are not necessarily drawn to scale.

Additionally, reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that the above Detailed Description of Specific Embodiments includes the referenced figures and following claims, and is more simply referred to herein as the "description" or the "disclosure". In the present description, various features are sometimes grouped together in a single embodiment, figure, or written explanation thereof for the purpose of streamlining this disclosure. However, this method of disclosure is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this description are hereby expressly incorporated into this description and disclosure, with each claim standing on its own as a separate embodiment. This description includes all permutations of the independent claims with their dependent claims.

In compliance with the statutes, the invention has been described in language more or less specific as to structural features and process steps where applicable. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A process for a thickening and fermenting of a surface waste from an activated sludge wastewater treatment system aeration basin, said process comprising the steps of:
   a) introducing a mixed liquor waste from the surface of an aeration basin into a reactor tank;
   b) settling the mixed liquor waste within the reactor tank under a quiescent condition;
   c) decanting and withdrawing a clarified liquid from a top portion of the reactor tank;
   d) discharging the clarified liquid;
   e) withdrawing a predetermined volume of a thickened mixed liquor from the reactor tank;
   f) discharging the thickened mixed liquor to a system for handling excess solids;
   g) beginning a fermentation period, where a settled bed of the thickened mixed liquor remains in the reactor tank for a predetermined period of time; and h) transferring a remaining fermented portion of the thickened mixed liquor back to the activated sludge liquid stream process, at the end of the fermentation period.

2. The process of claim 1, including the additional step of:
i) utilizing a microprocessor-based monitoring and control system is for controlling the operational sequencing and control of the batch surface waste thickening and fermenting processes.

3. The process of claim 1, including the additional step of:
i) determining a maximum fill volume in the reactor tank by a microprocessor-based controller, and the maximum fill volume is based on an input value from a liquid level sensor.

4. The process of claim 1, wherein said step of settling the mixed liquor waste within the reactor tank under a quiescent condition, additionally includes determining a duration of a settle period in the reactor tank by a microprocessor-based controller, the duration of the settle period based on an input value from a liquid/solids interface level sensor within the reactor tank.

5. The process of claim 1, wherein said step of decanting and withdrawing the clarified liquid from a top portion of the reactor tank additionally includes determining a quantity of the clarified liquid withdrawn from the reactor tank based on an input value from a liquid/solids interface level sensor within the reactor tank.

6. The process of claim 1, wherein said step of withdrawing the thickened mixed liquor from the reactor tank, a volume of the thickened mixed liquor to be wasted from the reactor tank and from which elevation in the thickened mixed liquor is to be wasted from the reactor tank additionally includes determining a quantity of the thickened mixed liquor withdrawn from the reactor tank based on an input value from a liquid/solids interface level sensor within the reactor tank.

7. The process of claim 1, wherein said step of transferring the thickened and fermented mixed liquor back to the activated sludge liquid stream process at the end of the fermentation period, additionally includes, determining by a microprocessor-based controller a duration of the fermentation period, the microprocessor-based controller basing the fermentation period that a measured oxidation-reduction potential value is at or below a predetermined value, and the microprocessor-based controller automatically terminating the fermentation period when said fermentation period is at or below a predetermined value or when the fermentation period reaches a predetermined set point time period in duration.

8. The process of claim 1, including the additional steps of:
i) controlling the operational sequencing and duration of said fermentation period, with a microprocessor-based monitoring and control system; and
j) determining the values of the oxidation-reduction potential values versus time and the point at which this value indicates that substantially all of the nitrate and/or nitrite in the mixed liquor has been denitrified thereby ending said fermentation period with said microprocessor-based monitoring and control system.

9. The process of claim 1, wherein said step of introducing the mixed liquor waste from the surface of an aeration basin into the reactor tank, additionally includes introducing the mixed liquor waste from the surface of an aeration basin into a multiple of reactor tanks, with each of the multiple of reactor tanks operating in a sequential batch process of a thickening and fermenting of a surface waste from an activated sludge wastewater treatment system aeration basin.

10. The process of claim 1, including the additional steps of:
i) introducing a second mixed liquor waste from the surface of said aeration basin into said reactor tank;
j) settling the second mixed liquor waste within the reactor tank under a quiescent condition;
k) decanting and withdrawing a second clarified liquid from a top portion of the reactor tank;
l) Discharging the second clarified liquid;
m) withdrawing a predetermined volume of a thickened second mixed liquor from the reactor tank;
n) discharging the thickened second mixed liquor to a system for handling excess solids;
o) beginning a second fermentation period, where a settled bed of the thickened mixed liquor remains in the reactor tank for a second predetermined period of time; and
p) transferring a remaining portion of the thickened and fermented mixed liquor back to the activated sludge liquid stream process, at the end of the second fermentation period.

11. The process of claim 10, wherein said step of settling the second mixed liquor waste within the reactor tank under quiescent conditions, additionally includes settling the second mixed liquor waste within the reactor tank under quiescent conditions until a liquid/solids interface layer within the reactor tank has reached a predetermined level.

12. The process of claim 10, wherein said step of settling the second mixed liquor waste within the reactor tank under a quiescent condition, additionally includes determining a duration of a second settle period in the reactor tank by a microprocessor-based controller, the duration of the second settle period based on a second input value from a liquid/solids interface level sensor within the reactor tank.

13. The process of claim 10, wherein said step of decanting and withdrawing the second clarified liquid from a top portion of the reactor tank additionally includes determining a quantity of the second clarified liquid withdrawn from the reactor tank based on a second input value from a liquid/solids interface level sensor within the reactor tank.

14. The process of claim 10, wherein said step of withdrawing the second thickened mixed liquor from the reactor tank a second volume of the second thickened mixed liquor to be wasted from the reactor tank and from which elevation in the second thickened mixed liquor is to be wasted from the reactor tank additionally includes determining a quantity of the second thickened mixed liquor withdrawn from the reactor tank based on a second input value from a liquid/solids interface level sensor within the reactor tank.

* * * * *